(12) United States Patent
Di Martino et al.

(10) Patent No.: US 11,371,439 B2
(45) Date of Patent: Jun. 28, 2022

(54) FUEL STAGING SYSTEM

(71) Applicant: ROLLS-ROYCE plc, London (GB)

(72) Inventors: Mario Di Martino, Derby (GB); Conor M Raynor, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 16/902,433

(22) Filed: Jun. 16, 2020

(65) Prior Publication Data
US 2021/0017908 A1    Jan. 21, 2021

(30) Foreign Application Priority Data

Jun. 26, 2019 (GB) .................................... 1909169

(51) Int. Cl.
| F02C 7/228 | (2006.01) |
| F02C 7/22  | (2006.01) |
| F02C 7/232 | (2006.01) |
| F23R 3/34  | (2006.01) |
| F23R 3/28  | (2006.01) |

(52) U.S. Cl.
CPC .............. *F02C 7/228* (2013.01); *F02C 7/222* (2013.01); *F02C 7/232* (2013.01); *F23R 3/283* (2013.01); *F23R 3/343* (2013.01); *F05D 2220/323* (2013.01); *F05D 2240/35* (2013.01); *F05D 2260/232* (2013.01)

(58) Field of Classification Search
CPC .. F23R 3/34; F23R 3/343; F23R 3/346; F23R 3/28; F23R 3/283; F28D 7/10–14; F02C 7/22; F02C 7/222; F02C 7/224; F02C 7/228; F02C 7/232; F02C 9/263
See application file for complete search history.

(56) References Cited

U.S. PATENT DOCUMENTS

| 4,041,695 A * | 8/1977 | Harper ..................... F02C 7/232 |
| | | 60/779 |
| 5,167,122 A | 12/1992 | Shekleton |
| 9,404,423 B2 | 8/2016 | Griffiths et al. |
| 9,874,351 B2 * | 1/2018 | Wolfe ..................... F02C 7/222 |

(Continued)

FOREIGN PATENT DOCUMENTS

| EP | 1553344 A2 | 7/2005 |
| EP | 1944485 A2 | 7/2008 |

(Continued)

OTHER PUBLICATIONS

Dec. 16, 2019 Search Report issued in Great Britain Patent Application No. 1909169.3.

(Continued)

*Primary Examiner* — Stephanie Sebasco Cheng
(74) *Attorney, Agent, or Firm* — Oliff PLC (57) ABSTRACT

A fuel staging system for a gas turbine engine has a plurality of fuel injectors each having a mains burner. The system has a mains manifold connected to a mains delivery line and configured to distribute fuel from the mains delivery line to the mains burner of each of the plurality of fuel injectors, and a check valve disposed in the mains delivery line upstream of the mains manifold. The check valve is configured to permit flow of fuel from the mains delivery line to the mains manifold when the pressure of fuel in the mains delivery line exceeds a threshold pressure.

14 Claims, 4 Drawing Sheets

(56) References Cited

U.S. PATENT DOCUMENTS

| | | | | |
|---|---|---|---|---|
| 2006/0130455 A1* | 6/2006 | Griffiths | ................... | F23K 5/06 |
| | | | | 60/39.281 |
| 2012/0159953 A1* | 6/2012 | Griffiths | ................. | F02C 7/228 |
| | | | | 60/734 |
| 2017/0009659 A1* | 1/2017 | Chalaud | ................. | F23R 3/343 |
| 2017/0268782 A1* | 9/2017 | Huang | ................... | F23R 3/343 |
| 2018/0163636 A1* | 6/2018 | Griffiths | ................. | F02C 9/263 |
| 2018/0163966 A1* | 6/2018 | Jones | ..................... | F02C 7/236 |

FOREIGN PATENT DOCUMENTS

| | | | |
|---|---|---|---|
| EP | 2541023 | A2 | 1/2013 |
| GB | 2557603 | A | 6/2018 |
| GB | 2563656 | A | 12/2018 |
| GB | 2563659 | A | 12/2018 |

OTHER PUBLICATIONS

Nov. 27, 2020 Extended Search Report issued in European Patent Application No. 20180029.9.

* cited by examiner

FUEL STAGING SYSTEM

CROSS-REFERENCE TO RELATED APPLICATIONS

This specification is based upon and claims the benefit of priority from United Kingdom patent application number GB 1909169.3 filed on Jun. 26, 2019, the entire contents of which are incorporated herein by reference.

BACKGROUND

Field of the Disclosure

The present disclosure relates to a fuel staging system for a gas turbine engine, and a gas turbine engine having the fuel staging system.

Background of the Disclosure

Fuel staging systems in gas turbine engines are used to distribute fuel to mains burners and pilot burners of a plurality of fuel injectors within a gas turbine engine. The fuel injectors are for injecting fuel and air into a combustion chamber of a gas turbine engine for burning. A fuel staging system may be used to control the amount of fuel and air injected by the fuel injectors in order to reduce emissions.

SUMMARY OF THE DISCLOSURE

According to a first aspect, there is provided a fuel staging system for a gas turbine engine, the fuel staging system comprising: a plurality of fuel injectors each comprising a mains burner; a mains manifold connected to a mains delivery line and configured to distribute fuel from the mains delivery line to the mains burner of each of the plurality of fuel injectors; and a check valve disposed in the mains delivery line upstream of the mains manifold, the check valve being configured to permit flow of fuel from the mains delivery line to the mains manifold when the pressure of fuel in the mains delivery line exceeds a threshold pressure.

The check valve may close when the pressure of fuel in the main delivery line is below the threshold pressure to prevent any flow. The check valve may close to prevent flow of fuel from the mains manifold to the mains delivery line. There may be no check valve provided at each of the fuel injectors.

The fuel staging system may comprise a splitter valve for splitting a fuel supply between the mains delivery line and a pilot delivery line. The plurality of fuel injectors may each comprise a pilot burner which is configured to receive fuel through the pilot delivery line. The splitter valve may be configured to variably split the fuel supply between the mains delivery line and the pilot delivery line.

The fuel staging system may comprise a pilot manifold connected to the pilot delivery line and configured to distribute fuel from the pilot delivery line to the pilot burner of each of the plurality of injectors.

The mains manifold may be in heat exchange relationship with a secondary fuel line. The mains manifold may comprise a common mains distribution line, and a plurality of feed lines which are configured to direct fuel to the mains burner of each of the fuel injectors. The common mains distribution line may be in heat exchange relationship with the secondary fuel line.

The fuel staging system may comprise a pipe-in-pipe arrangement in which a portion of the mains manifold is in heat exchange relationship with a portion of a secondary fuel line. The expression pipe-in-pipe arrangement is intended to mean that a portion of the mains manifold is disposed within the portion of the secondary fuel line or vice versa.

Each fuel injector may be provided with a weight distribution valve at the main burner, the weight distribution valve having a variable size opening, through which fuel is permitted to flow. The size of the opening may be a function of the orientation of the fuel injector within the gas turbine engine. The plurality of weight distribution valves may be configured to counteract effects on flow rate of a fuel head pressure through the respective fuel injectors which varies around a gas turbine engine.

Each fuel injector may be provided with a weight distributor valve at the pilot burner. The fuel staging system may comprise a further check valve disposed in the main delivery line upstream of the main manifold.

The fuel staging system may comprise a bypass line forming part of a main cooling circuit. The bypass line may be configured to receive fuel from the main delivery line when the check valve is closed and recirculate the fuel back into the main delivery line.

The secondary fuel line may be a portion of the pilot delivery line. The secondary fuel line may be a portion of the bypass delivery line.

According to a second aspect, there is provided a gas turbine engine for an aircraft, the gas turbine engine comprising a fuel staging system according to the first aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages.

Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 Nkg-1s, 105 Nkg-1s, 100 Nkg-1s, 95 Nkg-1s, 90 Nkg-1s, 85 Nkg-1s or 80 Nkg-1s. The specific thrust may be in an inclusive range bounded by any two of the values in the previous sentence (i.e. the values may form upper or lower bounds), for example in the range of from 80 Nkg-1s to 100 Nkg-1s, or 85 Nkg-1s to 95 Nkg-1s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400 K, 1450 K, 1500 K, 1550 K, 1600 K or 1650 K. The TET at cruise may be in an inclusive range bounded by any two of the values in the previous sentence (i.e. the values may form upper or lower bounds). The maximum TET in use of the engine may be, for example, at least (or on the order of) any of the following: 1700 K, 1750 K, 1800 K, 1850 K, 1900 K, 1950K or 2000 K. The maximum TET may be in an inclusive range bounded by any two of the values in the previous sentence (i.e. the values may form upper or lower bounds), for example in the range of from 1800 K to 1950 K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 degrees C. Purely by way of further example, the cruise conditions may correspond to: a forward Mach number of 0.85; a pressure of 24000 Pa; and a temperature of −54 degrees C. (which may be standard atmospheric conditions at 35000 ft).

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
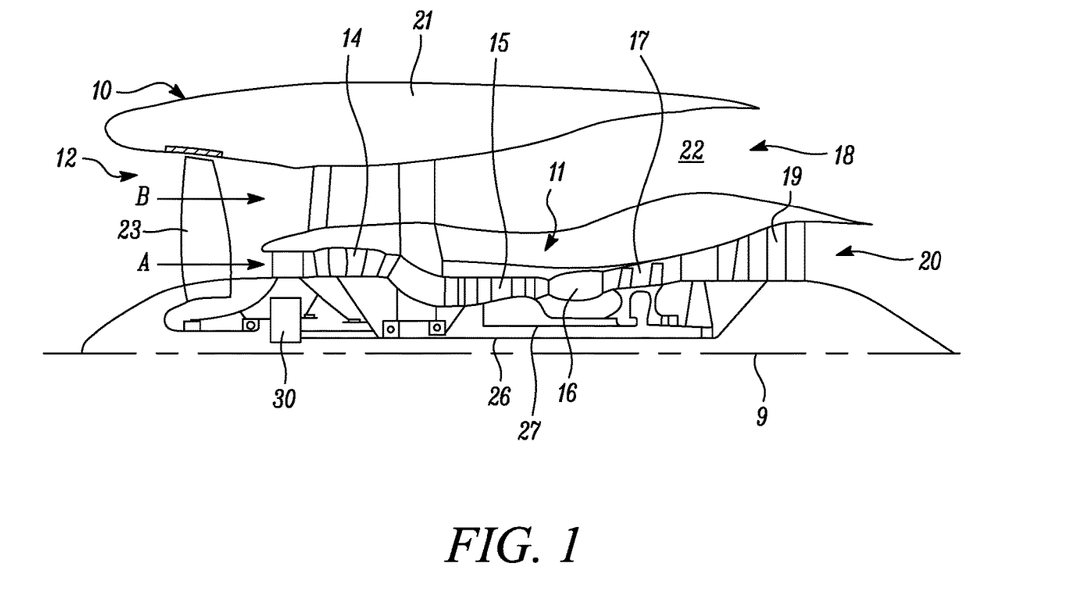
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
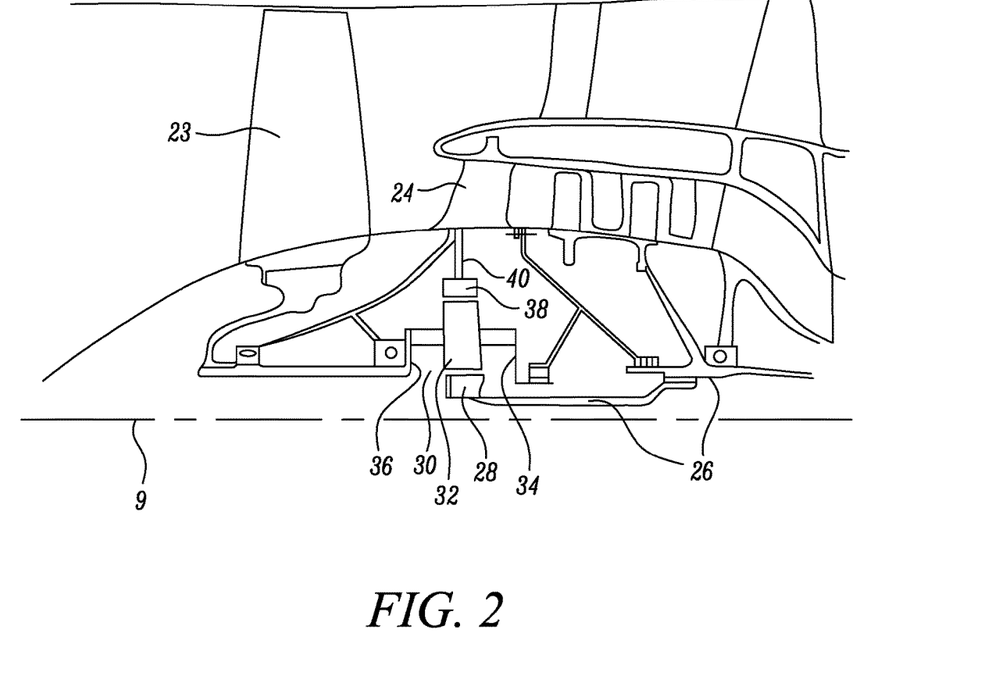
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
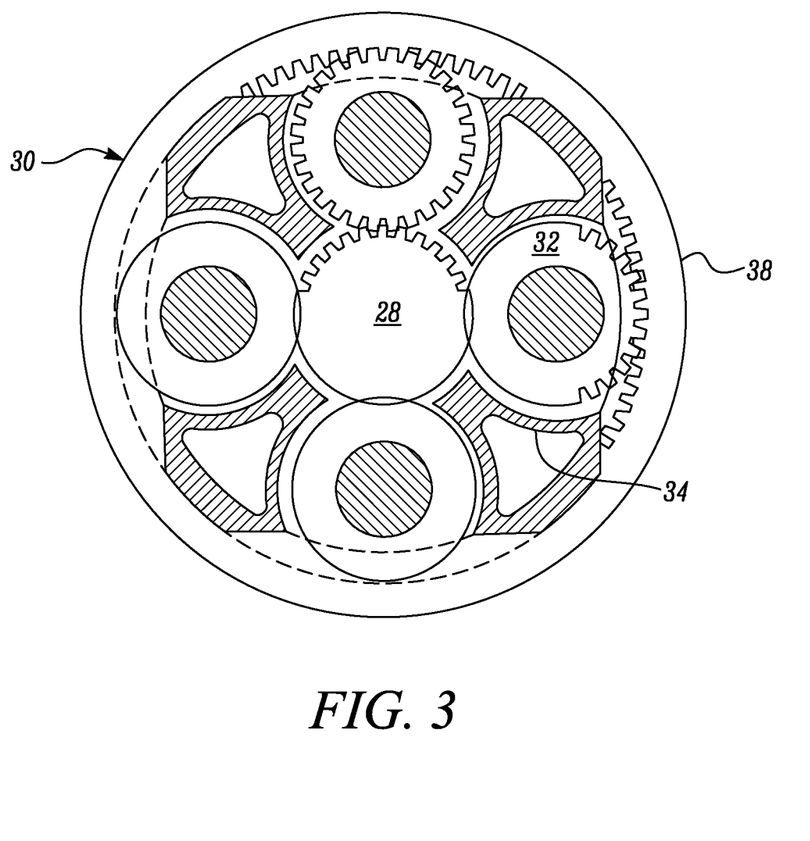
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
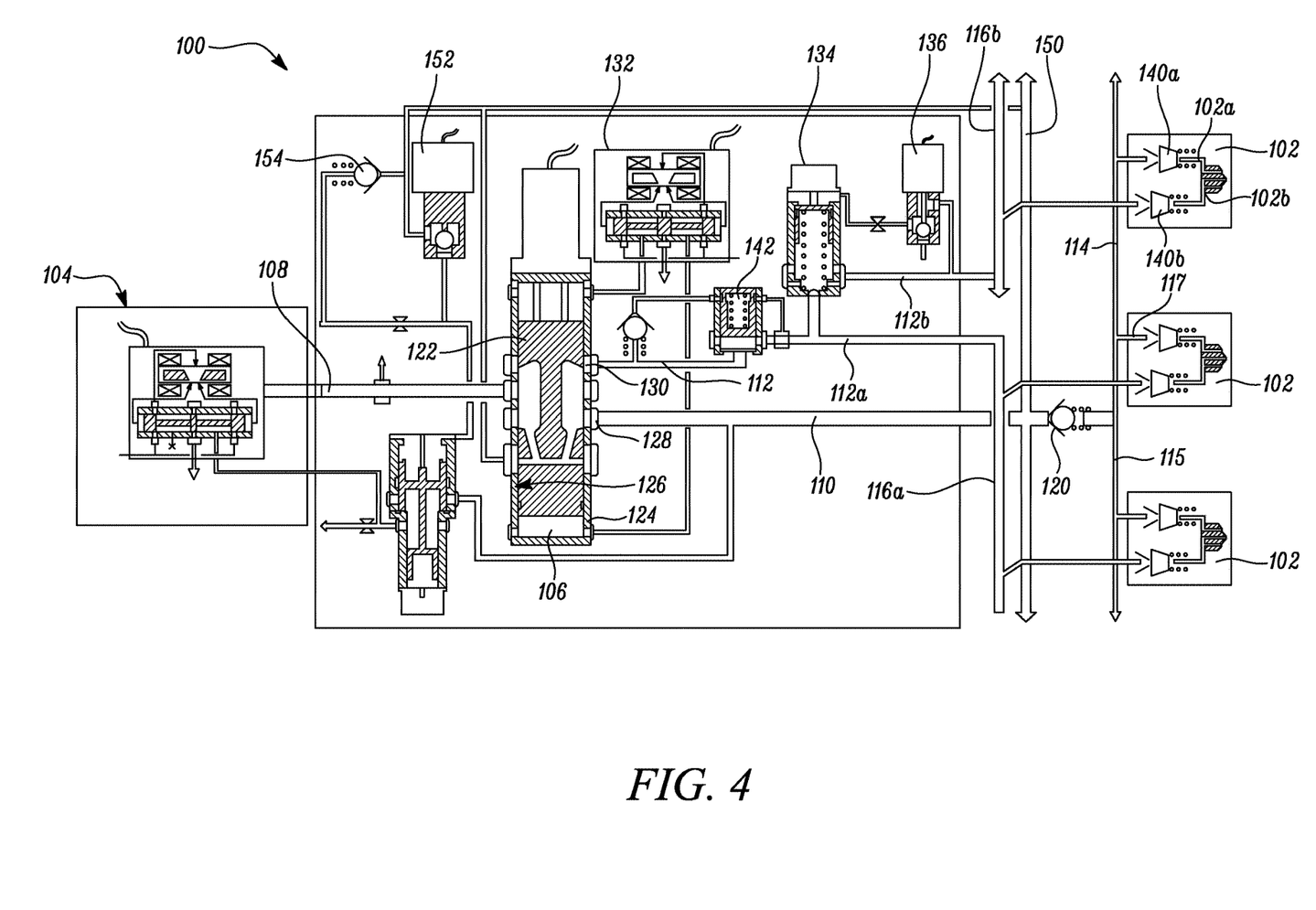
FIG. 4 shows a schematic view of an example fuel staging system.

FIG. 4 shows a schematic view of an example fuel staging system 100 which may form part of the combustion equipment 16 of the gas turbine engine 10.

The fuel staging system 100 comprises a plurality of fuel injectors 102 which are configured to mix fuel with air, and to inject the fuel-air mixture into a combustion chamber for combustion. Each fuel injector 102 comprises a mains burner 102a and a pilot burner 102b.

The staging unit 100 comprises a fuel flow splitting valve 106 which receives fuel from a fuel source 104 via a fuel supply line 108. The fuel flow splitting valve 106 is configured to split the flow into a mains delivery line 110 and a pilot delivery line 112.

The mains delivery line 110 and the pilot delivery line 112 are configured to deliver fuel to the mains burner 102a and pilot burner 102b respectively of each fuel injector 102.

The fuel flow splitting valve 106 comprises a spool 122 which is disposed within a bore 126 of a housing 124. The spool 122 is movable in a longitudinal direction within the bore 126, so as to selectively expose or cover a mains outlet 128 and pilot outlet 130 to thereby permit or block fuel flow respectively through the mains outlet 128 and pilot outlet 130. The mains outlet 128 is connected to the mains delivery line 110 and the pilot outlet 130 is connected to the pilot delivery line 112.

The fuel flow splitting valve 106 is configured to variably split the fuel supply between the mains delivery line 110 and the pilot delivery line 112. In other words, the fuel flow splitting valve 106 is configured to enable the fuel flow from the fuel supply line 108 to be split between the mains delivery line 110 and the pilot delivery line 112 in variable proportions. In this example, the proportions of fuel flow split into the mains delivery line 110 and the pilot delivery line 112 depend on the position of the spool 122 within the bore 126 of the housing 124.

In this example, the staging unit 100 also comprises a fuel splitting servo valve 132 which is configured to control the movement of the spool 122, and thus the position of the spool 122 within the bore 126, to thereby control the flow of fuel into the mains delivery line 110 and the pilot delivery line 112.

The mains delivery line 110 is connected to a mains manifold 114 which is configured to distribute the flow from the mains delivery line 110 to the mains burner 102a of each of the fuel injectors 102. The mains manifold 114 comprises a mains distribution line 115 extending circumferentially around the gas turbine engine, and a plurality of feed lines 117 distributed around the mains distribution line 115. Each feed line 117 is configured to feed fuel from the mains distribution line 115 to the mains burner 102a of a fuel injector 102.

In this example, the pilot delivery line 112 is split into two lines 112a, 112b which are each connected to a respective pilot manifold 116a, 116b. The pilot manifolds 116a, 116b are configured to distribute the fuel flow from the split pilot lines 112a, 112b to the pilot burners 102b in each of the fuel injectors 102. In some examples, there may be only one pilot delivery line which is connected to a pilot manifold.

Splitting the pilot delivery line 112 into two lines 112a, 112b enables the system to control delivery of fuel to the pilot burner 102b of specific groups of fuel injectors 102, in order to allow preferential fuelling of certain pilot burners 102b connected to one of the two lines 112a.

The staging unit 100 comprises a pilot fuel flow reducing valve 134 and a lean blow out fuel control valve 136 to act as a restrictor and control fuel flow into one of the split pilot lines 116b. This allows the fuel staging unit 100 to preferentially provide fuel to pilot burners 102b of specific injectors 102.

The fuel staging system 100 comprises a check valve 120 disposed in the mains delivery line 110, upstream of the mains manifold 114. The check valve 120 is configured to permit the fuel to flow from the mains delivery line 110 into the mains manifold 114 if the pressure of fuel in the mains delivery line 110 exceeds a threshold delivery pressure. The check valve 120 is also configured to prevent any flow therethrough if the pressure in the mains delivery line 114 is below a threshold pressure, and to prevent any flow from the mains manifold 114 to the mains delivery line 110.

Having a check valve 120 in the mains delivery line 110 enables the staging system 100 to omit check valves at each of the fuel injectors 102. This ensures that there will be no fuel maldistribution to the fuel injectors 102 which would otherwise occur in the event of a check valve at a fuel injector failing open. In the design of previously-considered fuel staging systems, it was believed that a feed line to each fuel injector should remain primed with fuel at all times by providing a check valve at each fuel injector. However, the inventors have found that fuel can be replenished downstream of a check valve in the mains delivery line sufficiently rapidly such that check valves at the individual injectors can be omitted without detrimentally affecting the performance of the engine.

As explained above, the fuel flow into the mains delivery line 110 is controlled by the position of the spool 122 in the bore 126 of the splitting valve 106. Therefore, the pressure of fuel in the mains delivery line 110 is also determined by the splitting valve 106.

Each of the fuel injectors 102 is provided with a mains weight distributor valve 140a at the mains burner 102a and a pilot weight distributor valve 140b at the pilot burner 102b. The mains weight distributor valves 140a of each fuel injector 102 are together configured to evenly distribute the fuel flow to the mains burners 102a to avoid maldistribution of fuel (i.e. to ensure an equal flow of fuel into each main burner 102a).

The pilot weight distribution valves 140b of each fuel injector 102 are together configured to evenly distribute the fuel flow in the pilot burners 102b, to avoid maldistribution of fuel (i.e. to ensure equal flow of fuel into each pilot burner 102b).

The weight distributor valves 140 comprise a weight and a spring, wherein the weight acts either with the force from the spring or against it, depending on the orientation of the weight distributor valve 140 (i.e. depending on the orientation of the fuel injector 102 within the gas turbine engine 10). The orientation of the fuel injectors 102 around the gas turbine engine 10 varies depending on the circumferential position of the fuel injector 102 around the gas turbine engine 10.

The weight distributor valves 140 comprise an opening through which fuel is permitted to flow. The size of the opening is variable and is determined by the combined force of the weight and the spring force of the weight distributor valve 140. Therefore, the size of the opening is dependent on the orientation of the respective weight distributor valve 140, and therefore the orientation of the respective fuel injector 102. Varying the size of the opening depending on the orientation of the fuel injector 102 can counteract effects on fuel flow rate of varying fuel head pressure around the mains distribution line 115.

The staging system 100 comprises a balancing pressure check valve 142, which is disposed between the fuel flow splitting valve 106 and the pilot fuel flow reducing valve 134. The balancing pressure check valve 142 is configured to return the flow upstream to the pilot delivery line 112 if the pressure downstream of the balancing pressure check valve 142 is too high. The balancing pressure check valve 142 together with the pilot weight distributor valves 140 therefore controls the pressure and fuel distribution in the pilot manifolds 116a, 116b.

The staging system 100 comprises a main cooling circuit comprising a bypass line 150 which is configured to receive fuel from the main delivery line 110 when the check valve 120 is closed. The fuel in the main delivery line 110 is recirculated through the bypass line 150 when the check valve 120 is closed, so as to maintain the main delivery line 110 primed.

The bypass line 150 comprises a recirculation valve 152 which is configured to open when the check valve 120 is closed, and to close when the check valve 120 is open. In this example, the recirculation valve 152 is controlled to open when the spool 122 is moved in the fuel flow splitting valve 106 to prevent the supply of fuel to flow into the main delivery line 110, and is controlled to close when the spool 122 is moved in the fuel flow splitting valve 106 to permit the supply of fuel into the main delivery line 110.

When the recirculation valve 152 is opened, flow is permitted through the recirculation valve 152 and a check valve 154. The fuel in the bypass line 150 is kept cool by the fact that it is circulated away from the fuel injectors 102, and therefore away from the main burners 102a and pilot burners 102b. It is then directed back into the mains delivery line 110. The fuel in the main delivery line 110 and bypass line 150 may also be cooled by air flows passing over the bypass line 150 or any other pipes in the main cooling circuit. Keeping the fuel in the main delivery line 110 and bypass line 150 cool prevents thermal degradation of the fuel.

Figure 5:
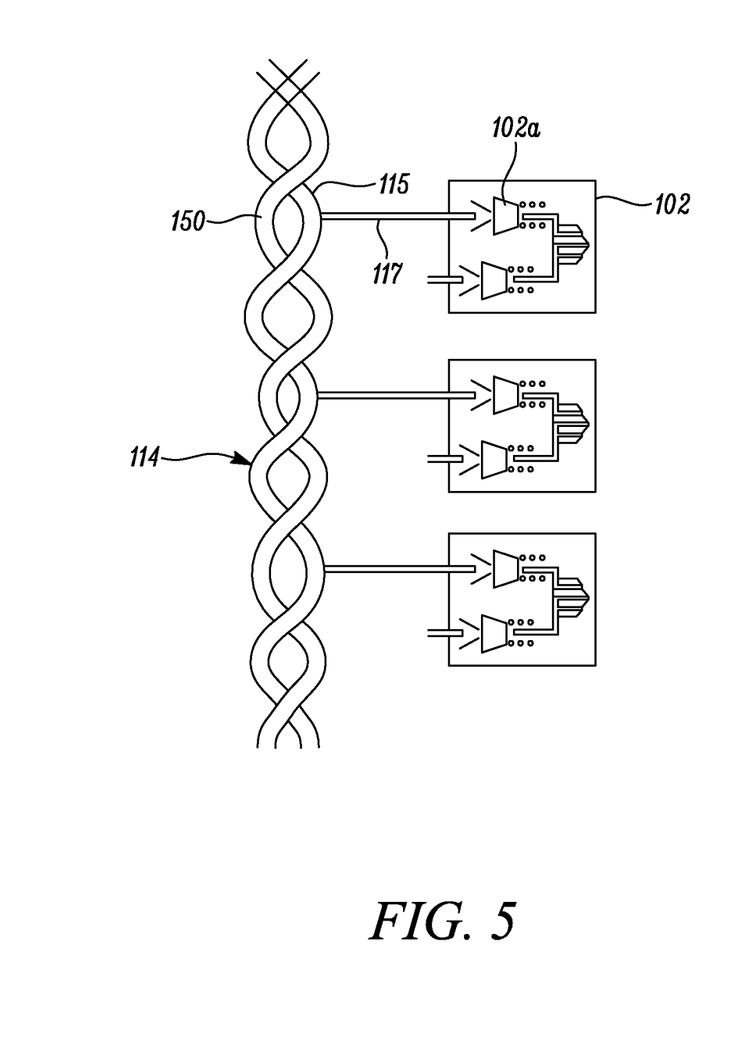
FIGS. 5 and 6 schematically show examples of a mains manifold of the fuel staging system in heat exchange relationship with a secondary line of the fuel staging system.
Figure 6:
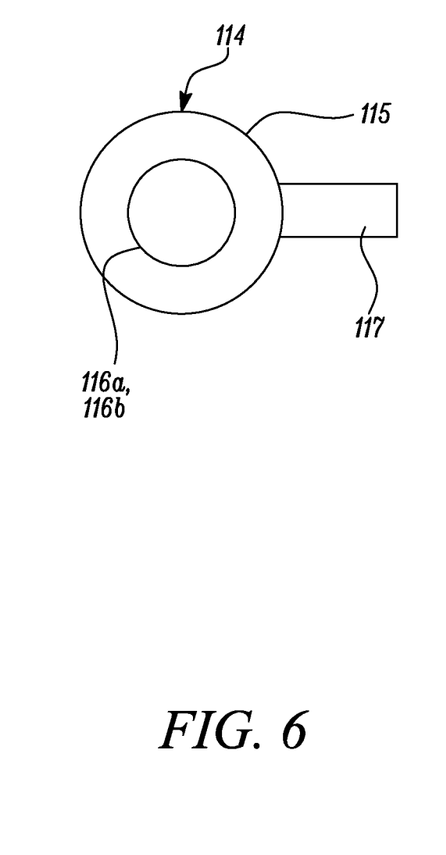

In this example, a portion of the mains manifold 114 is in heat exchange relationship with a secondary line, as shown for example in FIGS. 5 and 6. FIG. 5 shows the mains distribution line 115 of the mains manifold 114 intertwined with the bypass line 150, such that it is in heat exchange relationship with the bypass delivery line 150. The mains distribution line 115 and the bypass line 150 may be helically intertwined. The feed lines 117 extend from the mains distribution line 115 to the mains burner 102a of the fuel injectors 102. In other examples, the mains manifold may additionally or alternatively be in a heat exchange relationship with one or both of the pilot manifolds 116a 116b.

Having the mains manifold 114 in heat exchange relationship with the bypass line 150 ensures that any stagnant fuel or fuel residue in the mains manifold 114 when the check valve 120 is closed, is cooled by exchange of heat with the fuel in the bypass line 150. The fuel to the bypass line 150 is circulating in the main cooling circuit and so continues to be cooled so as to receive heat from the main manifold 114

FIG. 6 shows a cross sectional view of an alternative arrangement in which the mains manifold 114 is in heat exchange relationship with a secondary line. In this example, a portion of one of the pilot manifolds 116a, 116b is enclosed within the mains distribution line 115 of the mains manifold 114 in a pipe-in-pipe arrangement, such that the mains manifold 114 is in heat exchange relationship with the pilot manifold 116a, 116b. In some examples, a portion of the mains manifold may be enclosed within a portion of one or both of the pilot manifolds, or within a portion of the bypass delivery line in a pipe-in-pipe arrangement. In other examples, a portion of the bypass delivery line may be enclosed within a portion of the mains manifold in a pipe-in-pipe arrangement.

Although it has been described that a single check valve 120 is disposed in the main delivery line 110, in some examples, there may be two or more check valves 120 disposed in the main delivery line 110 to provide redundancy, in the event that one of the check valves 120 fails open.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A fuel staging system for a gas turbine engine, the fuel staging system comprising:
   a plurality of fuel injectors, each fuel injector of the plurality of fuel injectors includes a main burner and a pilot burner;
   a main manifold connected to a main delivery line, the main manifold being configured to distribute fuel from the main delivery line to the main burner of each fuel injector of the plurality of fuel injectors;
   a pilot manifold connected to a pilot delivery line, the pilot manifold being configured to distribute fuel from the pilot delivery line to the pilot burner of each fuel injector of the plurality of injectors,
   wherein both the main manifold and the pilot manifold deliver fuel to each fuel injector of the plurality of fuel injectors; and
   a check valve disposed in the main delivery line upstream of the main manifold and all of the plurality of fuel injectors and downstream of a recirculation line connected to the main delivery line upstream of the check valve, such that the recirculation line primes the check valve and the main delivery line upstream of the check valve when the check valve is closed,
   the check valve being configured to regulate flow of fuel from the main delivery line to the main manifold and all of the plurality of fuel injectors,
   the check valve being configured to open in response to a pressure of fuel in the main delivery line exceeding a threshold pressure.

2. The fuel staging system according to claim 1, further comprising a splitter valve configured to split a fuel supply between the main delivery line and the pilot delivery line.

3. The fuel staging system according to claim 2, wherein the splitter valve is configured to variably split the fuel supply between the main delivery line and the pilot delivery line.

4. The fuel staging system according to claim 2, wherein each fuel injector of the plurality of fuel injectors is provided with a weight distributor valve at the respective pilot burner.

5. The fuel staging system according to claim 1, wherein the main manifold is in a heat exchange relationship with a secondary fuel line, which is a portion of one of the pilot manifold or the recirculation line.

6. The fuel staging system according to claim 5, wherein:
   the main manifold includes a common main distribution line, and a plurality of feed lines that are configured to direct fuel to the main burner of each of the plurality of fuel injectors, and
   the common main distribution line is in the heat exchange relationship with the secondary fuel line.

7. The fuel staging system according to claim 5, further comprising a pipe-in-pipe arrangement in which a portion of the main manifold is in the heat exchange relationship with a portion of the secondary fuel line.

8. The fuel staging system according to claim 5, further comprising:
   a splitter valve configured to split a fuel supply between the main delivery line and the pilot delivery line, wherein the secondary fuel line is a portion of the pilot manifold.

9. The fuel staging system according to claim 1, wherein:
   each fuel injector of the plurality of fuel injectors is provided with a weight distribution valve at the respective main burner, the weight distribution valve having a variable size opening, through which fuel is permitted to flow; and
   a size of each of the variable size openings is a function of an orientation of the respective fuel injector of the plurality of fuel injectors within the gas turbine engine, whereby each of the plurality of weight distribution valves are configured to counteract effects on flow rate of a fuel head pressure through the respective fuel injector of the plurality of fuel injectors which varies around the gas turbine engine.

10. The fuel staging system according to claim 9, wherein each fuel injector of the plurality of fuel injectors is provided with a weight distributor valve at the pilot burner.

11. The fuel staging system according to claim 1, further comprising a further check valve disposed in the main delivery line upstream of the main manifold.

12. The fuel staging system according claim 1, wherein the recirculation line forms part of a main cooling circuit, the recirculation line being configured to receive fuel from the main delivery line when the check valve is closed and recirculate the fuel back into the main delivery line.

13. The fuel staging system according to claim 12, further comprising:
   a splitter valve configured to split a fuel supply between the main delivery line and the pilot delivery line, wherein each fuel injector of the plurality of injectors is provided with a weight distributor valve at the pilot burner, and a secondary fuel line is a portion of the recirculation line.

14. A gas turbine engine for an aircraft, the gas turbine engine comprising a fuel staging system comprising:
   a plurality of fuel injectors, each fuel injector of the plurality of fuel injectors includes a main burner and a pilot burner;
   a main manifold connected to a main delivery line, the main manifold being configured to distribute fuel from the main delivery line to the main burner of each fuel injector of the plurality of fuel injectors;
   a pilot manifold connected to a pilot delivery line, the pilot manifold being configured to distribute fuel from the pilot delivery line to the pilot burner of each fuel injector of the plurality of injectors,
   wherein both the main manifold and the pilot manifold deliver fuel to each fuel injector of the plurality of fuel injectors; and
   a check valve disposed in the main delivery line upstream of the main manifold and all of the plurality of fuel injectors and downstream of a recirculation line connected to the main delivery line upstream of the check valve, such that the recirculation line primes the check valve and the main delivery line upstream of the check valve when the check valve is closed,
   the check valve being configured to regulate flow of fuel from the main delivery line to the main manifold and all of the plurality of fuel injectors,
   the check valve being configured to open in response to a pressure of fuel in the main delivery line exceeding a threshold pressure.

* * * * *